Aug. 7, 1945.   A. F. COTA   2,381,261
X-RAY FILM HOLDER
Filed Aug. 28, 1942
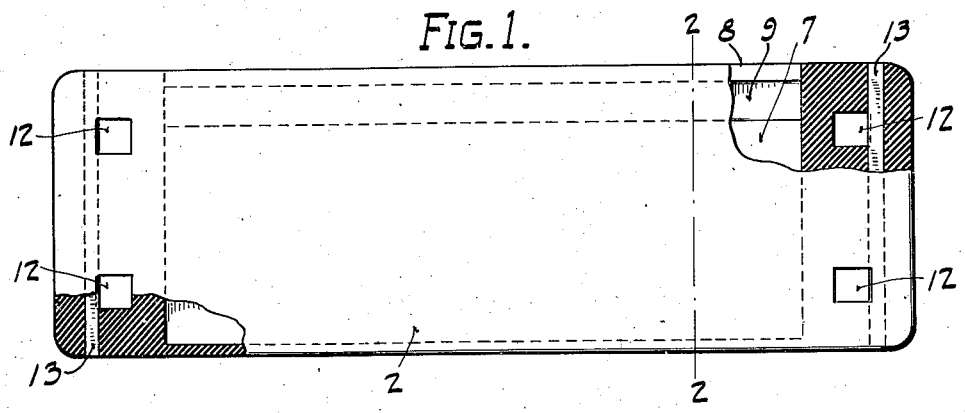
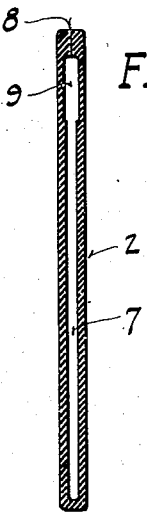
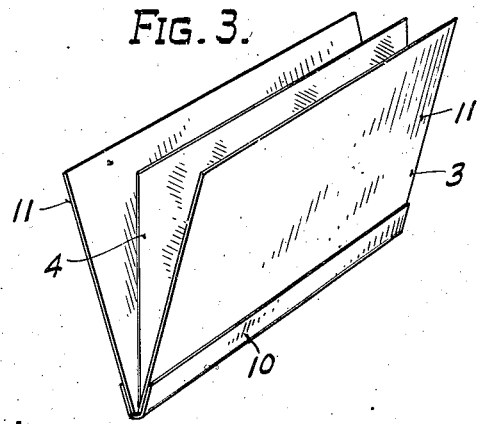
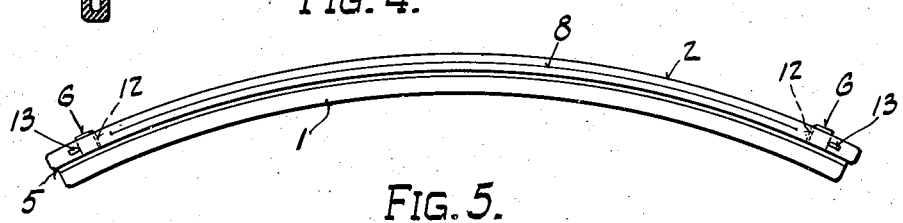
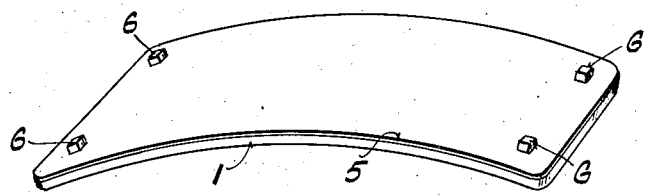
Alvin F. Cota
INVENTOR.
BY *Elvin A. Andrus*
ATTORNEY.

Patented Aug. 7, 1945

2,381,261

UNITED STATES PATENT OFFICE 2,381,261

X-RAY FILM HOLDER

Alvin F. Cota, Milwaukee, Wis., assignor to A. O. Smith Corporation, Milwaukee, Wis., a corporation of New York Application August 28, 1942, Serial No. 456,501

9 Claims. (Cl. 250—65)

This invention relates to an X-ray film holder and more particularly to a cassette for holding X-ray film in service. The invention has been employed in the X-raying of the circumferential welded seams of cylindrical or similarly shaped metal members.

The principal object of the present invention is to provide an X-ray film holder in which the intensifying screens of the holder are in perfect contact with both sides of the X-ray film to produce a sharp and distinct photograph.

Another object is to provide a film holder that is less costly to construct and economical to maintain.

A further object of the invention is to provide a film holder with a cassette envelope that can be readily applied and detached and carried without exposing the contained film to light.

Another object is to provide a film holder in which the lighter cassette envelope may be removed from the heavier mounting plate for transportation through the shop in large numbers.

In general, the invention employs a slightly curved metallic shoe of suitable size with a lead face on the convex side to provide means to catch stray radiation. Disposed next to the lead face is a cassette envelope, preferably of rubber, constructed to enclose and hold a specially provided flexible folder that contains the X-ray film. The folder provides intensifying screens in direct contact with the film and the upper edge of the folder is hinged with pliable material to prevent light from reaching the film. Circumferential tension is created in the cassette envelope in service to maintain close contact pressure between the intensifying screens and the X-ray film.

An embodiment of the invention is illustrated in the accompanying drawing.

In the drawing:

Figure 1 is a front elevational view partly in section of the cassette envelope employed in the film holder of the invention;

Fig. 2 is a view taken on line 2—2 of Fig. 1;

Fig. 3 is a perspective view of the folder employed to hold the films in service with the folder in a partial open position and a film therein;

Fig. 4 is a top edge view of the X-ray film holder showing a shoe and the cassette envelope secured to the shoe; and Fig. 5 is a perspective view of the metallic shoe employed.

Referring to the drawing there is illustrated an X-ray film holder comprising generally a curved metallic shoe 1 to which is attached a cassette envelope 2 of a flexible, elastic material such as rubber. A thin flexible folder 3 for containing an X-ray film 4 is adapted to be inserted inside the cassette envelope 2. An arm support, not shown, properly positions the holder when a picture is to be taken.

Metallic shoe 1 is slightly curved to stretch the cassette envelope thereon and adapts the holder for X-raying either the straight or curved seams of cylindrical members. The convex surface of shoe 1 is provided with an X-ray impervious material such as the thin sheet of lead 5 illustrated in Fig. 5 to absorb stray radiation from the rear of the film created by the X-ray machine.

The retaining posts or struck-up ears 6, preferably four in number, are each provided at approximately the respective corners of the convex side of shoe 1 to provide means for securing the cassette envelope 2 to the shoe under longitudinal tension. Other means to create circumferential tightening tension of the cassette envelope over the curved surface of the shoe may be employed.

The cassette envelope 2, as described, comprises preferably a stretchable, flexible material such as rubber that is molded to provide a generally large size pocket 7 which extends nearly to the lower edge of the cassette envelope and ends a substantial distance from the vertical ends of the same. The cassette envelope is closed on three sides and access to pocket 7 can only be made through slit 8 in the upper edge. Other types of flexible cassette envelopes may be employed if radial compression can be created in the same by circumferential tension.

The slit 8 of the cassette envelope is constructed in a tight fitting manner to be normally closed, as illustrated in Fig. 2, to provide a tight closure of the edge when folder 3 containing the X-ray film is inserted into pocket 7.

The space or pocket 7 has substantially the same cross section throughout. If preferred, however, the pocket may be enlarged adjacent slit 8 at the top of the cassette envelope as at 9 to provide clearance for hinge 10 of folder 3 when the latter is inserted into the pocket open edge first. By making pocket 7 slightly larger at 9 the hinge of folder 3, which ordinarily requires a slightly larger space than the body of the folder, can be accommodated without spreading slit 8 apart and disrupting the tight closure of the edge.

The folder 3 is shaped similar to an ordinary book, as illustrated in Fig. 3 and is utilized to enclose the X-ray film 4 to be inserted into pocket 7 of cassette envelope 2. The body 11 of the folder is preferably of thin cardboard that is readily flexible to co-operate with the flexing of cassette envelope 2 in service.

The hinge 10 of folder 3 is made of any suitable, light weight impervious cloth or similar material. The hinge operates to join the two body portions of the folder together and to close one longitudinal edge of the same when a film is inserted therein and the folder closed. When the folder containing an X-ray film is inserted within cassette envelope 2, the hinge 10 is disposed in the enlarged portion 9 of pocket 7 adjacent slit 8. The hinge and the closure of the slit 8 prevent outside light from penetrating to the contained film.

The outer surface of folder 3 is covered with a light impervious paint such as is employed in photographic work. The inner surface of the folder is covered with a fluorescent material which is capable of emitting radiation under the action of X-rays to provide an intensifying screen to sensitize the film in service.

At approximately the respective corners of the cassette envelope 2 and outside the horizontal extent of pocket 7 are disposed the preferably square apertures 12. Cassette envelope 2 is suspended on shoe 1 by forcing the retaining posts 6 through apertures 12. The longitudinal distance between apertures 12 is slightly less than the same distance between the retaining posts 6 to require a slight stretching of cassette envelope 2 in applying it to the posts.

Stiffening metal strip inserts 13 may be employed at each of the outer vertical end portions of cassette envelope 2 at the outer edges of the apertures 12 to keep the end portions extended and to provide a reinforcement at apertures 12.

When cassette envelope 2 has been stretched upon the convex side of shoe 1, the X-ray film lies in proper position for the taking of the X-ray picture. The stretching of cassette envelope 2 onto retaining posts 6 provides sufficient radial pressure to force the fluorescent intensifying screen surface of folder 3 into perfect uniform close contact with both sides of the X-ray film. This prevents blurring and produces a sharp and distinct X-ray picture.

The cassette envelope containing the folder with the X-ray film is easily removed after the X-raying is completed by merely slipping the cassette envelope off posts 6. It may then be readily transported to the dark room where the film is removed. In the meantime, another cassette envelope can be applied to shoe 1 in preparation for further X-raying.

The invention not only provides a handy film holder and one in which the film fits perfectly for good results, but it decreases expense and costs in the construction of film holders. It also saves on labor and time costs in the handling, loading and transportation of film to various parts of the factory or other establishment where such film is utilized.

Various embodiments of the invention may be employed within the scope of the accompanying claims.

I claim:

1. A film holder comprising a curved metallic shoe having means on one surface thereof to absorb stray radiation, a cassette envelope of pliable elastic material, means to secure said cassette envelope to said shoe in a manner to create tension in the cassette envelope, a flexible folder member adapted to hold X-ray film and to shield the same from light rays and disposed for insertion within said cassette envelope, and fluorescent material provided on the inside surface of said folder, said material being forced into uniform contact with said film when the cassette envelope is stretched in service over the convex curvature of said shoe to provide a sharp and distinct photographic picture.

2. A film holder for X-ray film comprising, a curved metallic shoe, a generally thin lead surface provided on the convex side of said shoe to absorb stray radiation, a cassette envelope of pliable elastic rubber, means to secure the cassette envelope to said shoe in a manner to create tension in the cassette envelope and to permit ready application and removal of the same, a pliable folder of substantially thin material adapted to hold films and shield the same from light rays and disposed for insertion in said cassette envelope, and fluorescent material provided on the inside surface of said folder, said material being radially compressed into close contact with said film when the cassette envelope is stretched over the convex surface of said shoe in service to provide a sharp and distinct photographic picture.

3. A film holder for X-ray film, comprising a curved metallic shoe having retaining posts at the respective corners thereof and a substantially thin lead surface disposed on the convex side of the shoe to absorb stray radiation, a cassette envelope of flexible elastic rubber with apertures therein at the respective corners thereof to dispose the cassette envelope on the retaining posts of said shoe, a flexible folder of substantially thin material disposed for insertion in said cassette envelope and provided with a light weight hinge of impervious material at the upper longitudinal edge thereof to prevent light rays from penetrating to said film through the exposed opening in said cassette envelope, impervious paint disposed on the outside surface of said folder, and fluorescent material provided on the inside surface of the same.

4. In a film holder for X-ray film, a curved metallic shoe having retaining posts at the respective corners thereof and a substantially thin lead surface disposed on the convex side of the shoe to absorb stray radiation, a cassette envelope of flexible elastic rubber with apertures therein at the respective corners thereof to dispose the cassette envelope on the retaining posts of said shoe.

5. In a film holder for X-ray film, a curved metallic shoe having retaining posts at the respective corners thereof and a substantially thin lead surface disposed on the convex side of the shoe to absorb stray radiation, a cassette envelope of flexible elastic rubber with apertures therein at the respective corners thereof to permit hanging of the cassette envelope on the retaining posts of said shoe in a manner to create tension in said cassette envelope and to effect ready application and removal of the same, a flexible folder of substantially thin material disposed for insertion in said cassette envelope and provided with a light weight hinge of impervious material at the upper longitudinal edge thereof to prevent light rays from penetrating to said film through the exposed opening in said cassette envelope.

6. In a film holder, a portable cassette envelope of flexible material, a film confined in said envelope, intensifying screens in contact with the surfaces of said film in said envelope, and means acting directly upon said envelope for tensioning the same in service and thereby securing said screen in uniform surface engagement with said film.

7. An X-ray film holder, comprising a base member constituting a shield for one side of the film and having upstanding posts thereon for securing a cassette thereto, and a portable cassette envelope of flexible elastic material having apertures registering with said posts when the cassette is tensioned on said base member.

8. An X-ray film holder, comprising a base member constituting a shield for one side of the film and having upstanding posts thereon for securing a cassette thereto, a portable cassette envelope of flexible elastic material having apertures registering with said posts when the cassette is tensioned on said base member, an X-ray film in said envelope, and a fluorescent sheet engaging said film, the tensioning of said cassette upon said base serving to provide uniform surface engagement of said sheet and film.

9. An X-ray film holder, comprising a base member constituting a shield for one side of the film and having upstanding posts thereon for securing a cassette thereto, a portable cassette envelope of flexible elastic material having apertures registering with said posts when the cassette is tensioned on said base member, an X-ray film in said envelope, and a fluorescent sheet engaging said film, said base being curved to facilitate tensioning of the cassette thereon and provide tight surface engagement between the sheet and film.

ALVIN F. COTA.